H. DERDEYN.
DISTRIBUTING APPARATUS.
APPLICATION FILED MAY 5, 1911.

1,019,609.

Patented Mar. 5, 1912.

2 SHEETS—SHEET 1.

Witnesses:—
Christ Feinle, Jr.

Inventor,
Hector Derdeyn.
By Victor J. Evans,
Attorney

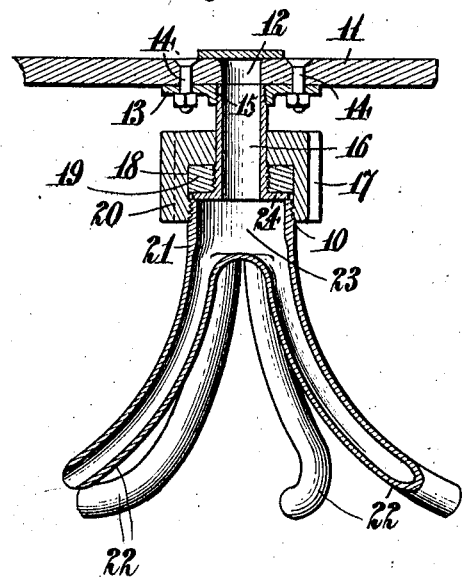
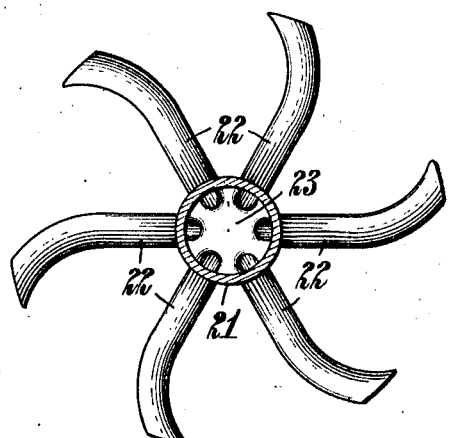
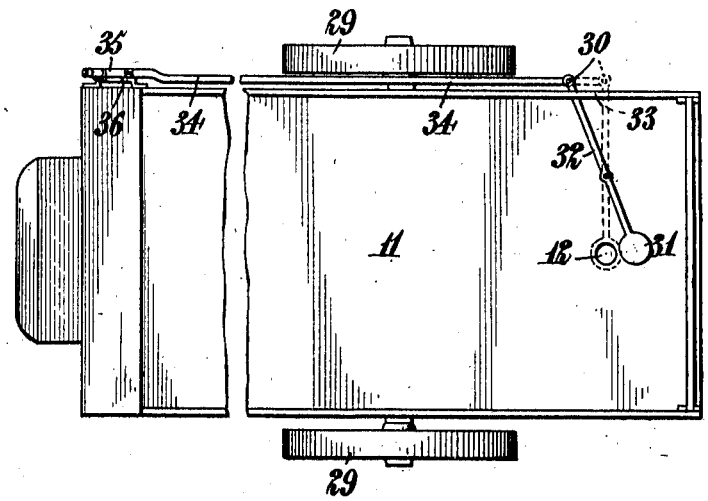

UNITED STATES PATENT OFFICE.

HECTOR DERDEYN, OF JACKSONVILLE, ILLINOIS.

DISTRIBUTING APPARATUS.

1,019,609. Specification of Letters Patent. Patented Mar. 5, 1912.

Application filed May 5, 1911. Serial No. 625,125.

*To all whom it may concern:*

Be it known that I, HECTOR DERDEYN, a subject of the King of Belgium, residing at Jacksonville, in the county of Morgan and State of Illinois, have invented new and useful Improvements in Distributing Apparatus, of which the following is a specification.

An object of the invention is to provide a distributer for centrifugally distributing liquid or dry substance such as fertilizers and the like. For the purpose mentioned, use is made of a tubular distributer for revoluble attachment to a vehicle or the like, transmission means being provided for connecting the distributer with the axle of the vehicle to operate the same when the vehicle is operated, the mentioned distributer being adapted to eject the distributing substance in a centrifugal manner.

Reference is to be had to the accompanying drawings constituting a part of this specification, in which similar characters of reference denote corresponding parts in all the views, and in which—

Figure 1:
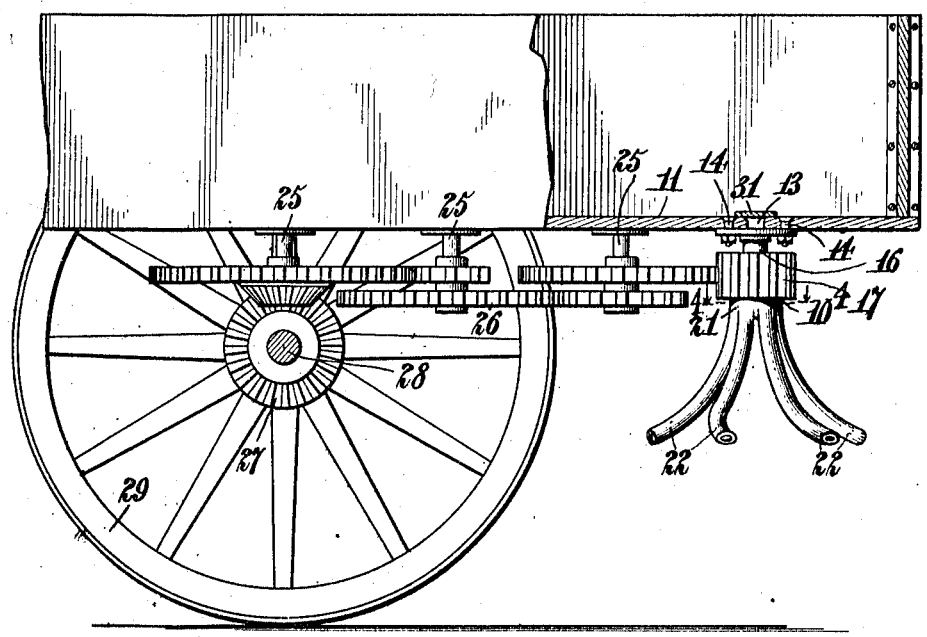
Figure 2:
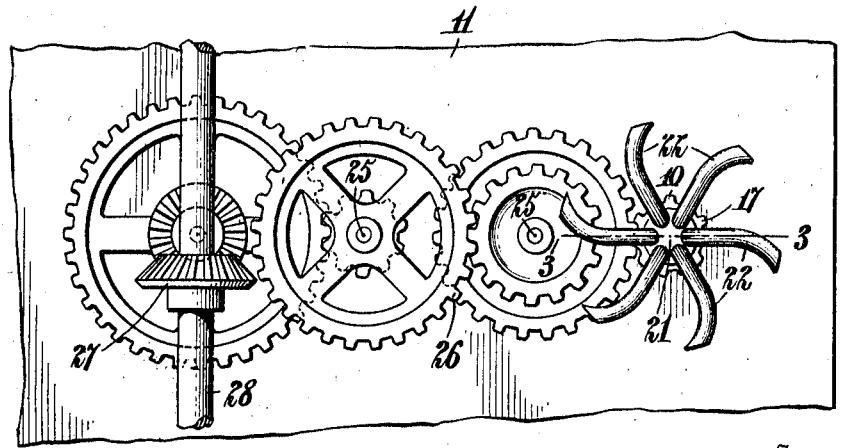

Figure 1 is a side elevation of a portion of a vehicle showing my device operatively attached thereto, parts being broken away to disclose the underlying structure. Fig. 2 is a view looking at the under side of the vehicle shown in Fig. 1 and showing the arrangement of the transmission mechanism. Fig. 3 is a vertical section taken substantially on the line 3—3 in Fig. 2. Fig. 4 is a horizontal section taken on the line 4—4 in Fig. 1, looking in the direction of the arrow. Fig. 5 is a fragmentary plan view of a vehicle having my device attached thereto and showing a means for cutting off the supply from the vehicle to the distributer.

Referring more particularly to the views I provide a distributer 10 for revoluble attachment to the under side of a vehicle 11 having an aperture 12 in the floor thereof.
The distributer 10 consists of a circular plate 13 secured to the under side of the vehicle 11 by means of suitable bolts 14 and provided with an opening 15. Extending through the said opening 15 and threadedly engaging the plate 13 is a tubular shank 16 positioned to register with the aperture 12 in the floor of the vehicle 11. A toothed wheel 17 is revolubly mounted on the shank 16 and has a recessed portion 18 in which is received a collar 19 threadedly engaging the shank 16 to retain the toothed wheel 17 in rotative engagement with the shank 16. The toothed wheel 17 has an integral depending flange 20 threaded on the inner periphery thereof and screw-threadedly connected to the inner periphery of the flange 20 of the toothed wheel 17 is a spider 21, consisting of curved tubular prongs 22 terminating at their upper ends in the chamber 23, the lower end of the shank 16 being provided with a laterally extending flange 24 constituting a seat for the collar 19 as will be seen by referring to Fig. 3.

Journaled on shafts 25 secured to the under side of the vehicle 11 is a train of intermeshing gears 26, connecting the toothed wheel 17 with a beveled wheel 27 keyed to the axle 28 having the wheels 29 of the vehicle 11 mounted thereon.

Assuming that the vehicle 11 has been filled with bone shavings or any similar fertilizer, when the vehicle is operated over the ground in the usual manner the rotating action of the wheels forming a part of the running gear of the vehicle will transmit motion to the train of gears 26, which in turn connected to the toothed wheel 17 will force the same to revolve thus also rotating the spider 21. The fertilizer contained in the vehicle 11 will gravitationally move downwardly through the shank 16 and into the chamber 23, from which it will be ejected outwardly through the curved tubular prongs 22, the force with which the fertilizer will be forced outwardly through the prongs 22 being proportionate to the centrifugal force produced by the spider 21 and the fertilizer will be evenly distributed over the ground as will be readily understood.

To control the flow of fertilizer through the shank 16 and the spider 21 I have provided a controlling means 30, conveniently shown in Fig. 5. The controlling means 30 consists primarily of a flat plate 31 pivotally mounted on the floor of the vehicle and having a lever 32 extended exteriorly of the vehicle through a slot 33 therein, the outer end of the said lever being pivotally connected to an operating rod 34 having its other end pivotally connected to an operating lever 35 mounted to operate in a notched bearing 36, the plate 31 being adapted to be removably positioned over the aperture 12 in the floor of the vehicle 11 when the lever 35 is operated, thus cutting off the supply of fertilizer from the vehicle to the distributer. By providing the notches in the bearing 36, the lever 35 can be moved to any desired position and retained in that position so that the supply of fertilizer to be distributed can be controlled at all times.

Although in the description of my device I have mentioned the use of a dry fertilizer in connection therewith it will be understood that liquids can be used with my device in the same manner that dry substances are used and although 'for the purpose of describing my distributing apparatus I have shown a particular construction thereof, it will be understood that the scope of the invention is defined in the appended claims.

Having thus fully described the invention, what I claim as new, is:—

1. A device of the class described comprising a tubular shank for engagement with the under side of a vehicle and in register with an aperture in the floor of the vehicle a toothed wheel journaled on the said shank, a collar threadedly engaging the shank to revolubly retain the toothed wheel on the shank, a spider threadedly connected with the lower end of the toothed wheel and revoluble therewith, the said spider being provided with an aperture in register with the said tubular shank, curved tubular prongs depending from the said spider and integral therewith and a train of gears connecting the said toothed wheel with the axle of the said vehicle for rotating the said spider when the said vehicle is operated.

2. A device of the class described comprising a tubular shank for engagement with the under side of a vehicle and in register with an aperture in the floor of the vehicle, a toothed wheel journaled on the said shank, a collar threadedly engaging the shank to revolubly retain the toothed wheel on the shank, a spider threadedly connected with the lower end of the toothed wheel and revoluble therewith, the said spider being provided with an aperture in register with the said tubular shank, curved tubular prongs depending from the said spider and integral therewith, a train of gears connecting the said toothed wheel with the axle of the said vehicle for rotating the said spider when the said vehicle is operated and means mounted on the said vehicle for controlling the supply of material from the vehicle to the said spider.

3. A device of the class described comprising a tubular shank for engagement with the under side of a vehicle and in register with an aperture in the floor of a vehicle, a toothed wheel journaled on the said shank, a collar threadedly engaging the said shank for retaining the said toothed wheel in position thereon, a spider rigidly connected to the said toothed wheel and provided with an aperture in register with the said shank, curved tubular prongs depending from the said spider and means for rotating the said spider.

4. A device of the class described comprising a tubular shank for engagement with the under side of a vehicle and in register with the aperture in the floor of a vehicle, a toothed wheel journaled on the said shank, a collar threadedly engaging the said shank for retaining the said toothed wheel in position thereon, a spider rigidly connected to the said toothed wheel and provided with an aperture in register with the said shank, curved tubular prongs depending from the said spider, means for rotating the said spider and controlling means for controlling the supply of material from the said vehicle to the said spider.

In testimony whereof I affix my signature in presence of two witnesses.

HECTOR DERDEYN.

Witnesses:
JOHN KEARNS,
THOS. HARBER.